US012688070B2

(12) United States Patent
Michaelis et al.

(10) Patent No.: US 12,688,070 B2
(45) Date of Patent: Jul. 21, 2026

(54) SHARED ARITHMETIC LOGIC UNIT

(71) Applicant: MELLANOX TECHNOLOGIES, LTD., Yokneam (IL)

(72) Inventors: Noam Michaelis, Kfar-Saba (IL); Itamar Rabenstein, Petach-Tiqwa (IL); Ofir Klara Altshul, Herzliya (IL); Idan Matari, Lod (IL); Aviv Avraham Paxton, Petah Tikva (IL); Nechami Sternfeld, Bnei Brak (IL); Inbar Adler, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 451 days.

(21) Appl. No.: 18/218,555

(22) Filed: Jul. 5, 2023

(65) Prior Publication Data

US 2025/0013499 A1 Jan. 9, 2025

(51) Int. Cl.
G06F 9/50 (2006.01)

(52) U.S. Cl.
CPC .......... G06F 9/5038 (2013.01); G06F 9/5072 (2013.01)

(58) Field of Classification Search
CPC ................. G06F 9/5038; G06F 9/5072; G06F 2209/509; G06F 9/5027; H04L 49/101
See application file for complete search history.

(56) References Cited

U.S. PATENT DOCUMENTS

| | | | | |
|---|---|---|---|---|
| 9,164,782 B2 * | 10/2015 | Pagan | ................. | G06F 9/45558 |
| 9,391,845 B2 * | 7/2016 | Heinz | ..................... | G06F 9/546 |
| 9,531,602 B1 * | 12/2016 | Barsness | .............. | G06F 9/5005 |
| 10,824,474 B1 * | 11/2020 | Kamboj | ................ | G06F 9/5038 |
| 11,888,931 B1 * | 1/2024 | Matthews | .............. | G06N 20/00 |
| 2010/0325636 A1 * | 12/2010 | Ringseth | ................ | G06F 9/505 |
| | | | | 718/104 |
| 2012/0110588 A1 * | 5/2012 | Bieswanger | .......... | G06F 9/5077 |
| | | | | 718/104 |
| 2016/0087848 A1 * | 3/2016 | Heinz | ..................... | G06F 9/546 |
| | | | | 370/256 |
| 2017/0063613 A1 * | 3/2017 | Bloch | ..................... | H04L 12/44 |
| 2018/0091442 A1 * | 3/2018 | Chen | ..................... | H04L 49/101 |
| 2018/0255137 A1 * | 9/2018 | Hu | ........................ | H04L 63/102 |
| 2019/0158424 A1 * | 5/2019 | Aronovich | ............ | H04L 47/822 |
| 2021/0034427 A1 * | 2/2021 | Duda | .................... | G06F 9/5022 |

FOREIGN PATENT DOCUMENTS

| | | | | |
|---|---|---|---|---|
| EP | 3913895 A1 * | 11/2021 | ........... | G06F 3/0604 |
| WO | WO-2015130613 A1 * | 9/2015 | ........... | G06F 9/5077 |

* cited by examiner

*Primary Examiner* — Michael A Keller
(74) *Attorney, Agent, or Firm* — Sheridan Ross P.C.

(57) ABSTRACT

A network device, system, and method are provided. An illustrative network device includes a plurality of ports connectable to a communication network, one or more reduction units decoupled from the plurality of ports, and configurable logic to service packet transmission between the one or more reduction units and the plurality of ports.

20 Claims, 6 Drawing Sheets

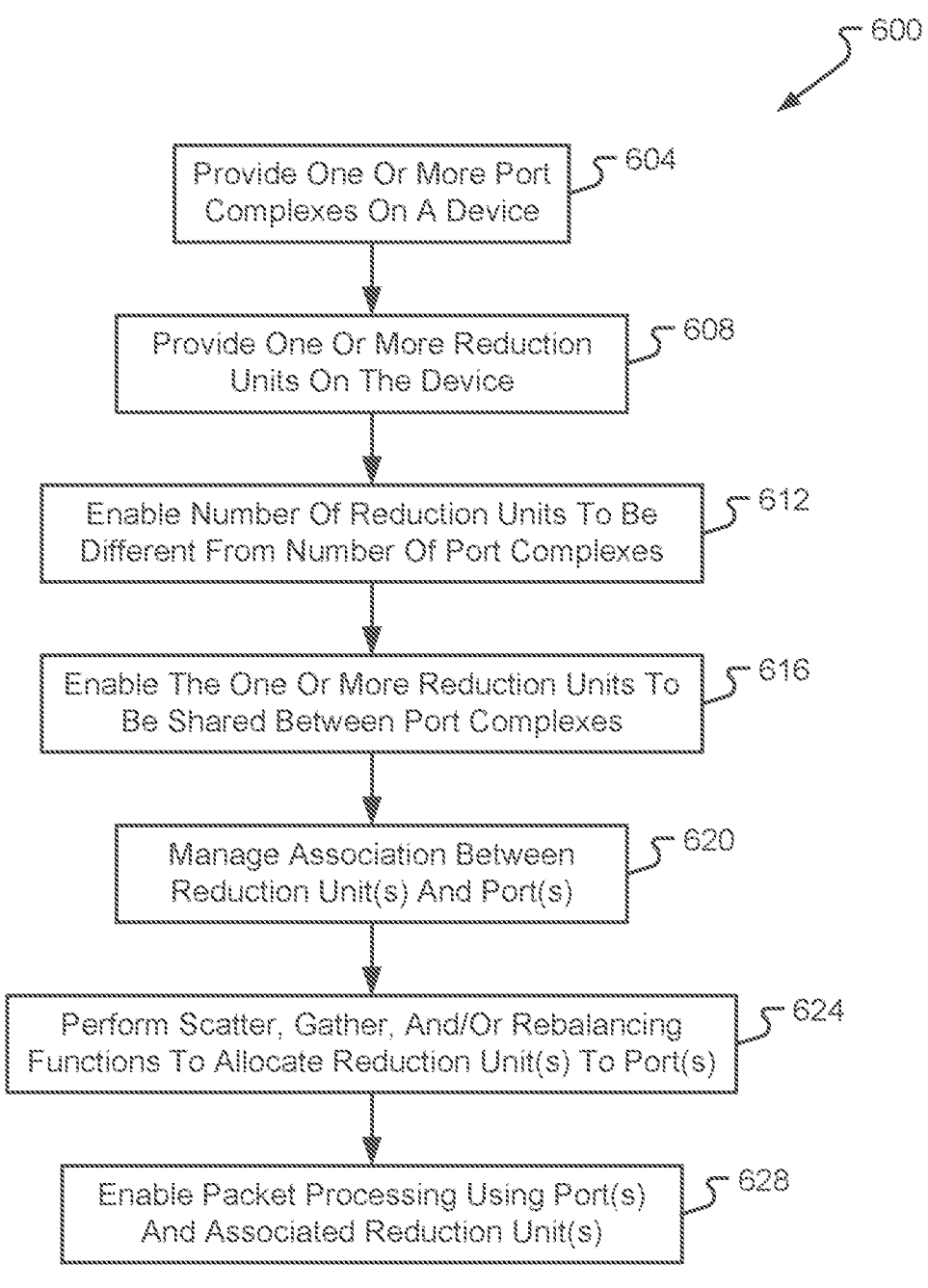

600

Provide One Or More Port Complexes On A Device ⌇604

Provide One Or More Reduction Units On The Device ⌇608

Enable Number Of Reduction Units To Be Different From Number Of Port Complexes ⌇612

Enable The One Or More Reduction Units To Be Shared Between Port Complexes ⌇616

Manage Association Between Reduction Unit(s) And Port(s) ⌇620

Perform Scatter, Gather, And/Or Rebalancing Functions To Allocate Reduction Unit(s) To Port(s) ⌇624

Enable Packet Processing Using Port(s) And Associated Reduction Unit(s) ⌇628

*Fig. 6*

SHARED ARITHMETIC LOGIC UNIT

FIELD OF TECHNOLOGY

The present disclosure relates to switches that support in-network computing, and more particularly, to techniques for achieving increased reduction capacity in switches.

BACKGROUND

A crossbar switch may implement permutations of connections among source ports and destination ports. In-network reduction increases the total bandwidth of the crossbar switch.

SUMMARY

In some memory subsystems, the crossbar has the routing flexibility to send (certain) packets on any port within a subset of destination ports, and the packet will reach the final client where the packet can be reassembled. Embodiments of the present disclosure aim to provide an improved architecture that enables sharing of one or more Arithmetic Logic Units (ALUs) between ports or port complexes of a switch.

Traditional switches have been known to include ALUs, but the ALUs are normally non-shared. In other words, traditional switches allocate ALUs to ports on a 1:1 basis. Embodiments of the present disclosure propose an architecture in which this strict 1:1 assignment of ALUs to ports is not required, providing many technical benefits. As one example, the architecture proposed herein may support the reduction bandwidth to be different from the switch bandwidth. ALU area may be saved by sharing ALUs without losing any bandwidth. A headers to data ratio maybe different depending on the protocol used, but the ratio generally ranges between 10-30%. Since headers are not part of the reduction operation, the present disclosure removes the headers before reduction operations and regenerates the headers to send the packet. In other words, ALU resources are not used to handle the header, which allows all of the ALU bandwidth to be used for reduction operations. Additionally, or alternatively, the present disclosure does not require full wire speed reduction from all ports at the same time. For example, a switch with a total bandwidth of x may have a reduction bandwidth that is a percentage (e.g., 50%) of x (e.g., not all ports are running reduction at the same time). In other words, not all ports have to be connected on real systems boards (saving space allocation), and that design flexibility is improved (allowing customers to decide the total reduction bandwidth, which can be lower than the full switch bandwidth).

In the legacy approach where there is a 1:1 connection between the reduction unit and the port logic, the crossbar is always n×n where n is number of ports connected to switch, and the total bandwidth that the crossbar could handle is twice the bandwidth of the switch, since data has to flow to and from the reduction units. In the present disclosure, the reduction units are not mapped to the port logic, and the reduction units may be split into several smaller units, so that in total the crossbar is n×m where n is number of logical ports and m number of smaller reduction units. It is easier to maintain full wire speed in the crossbar when m>>n, since there will be less collisions per reduction unit.

Yet another example of a technical benefit provided by the architecture proposed herein is that a fixed-sized macro ALU can be provided. As will be described herein, the fixed-sized macro ALU can be used in multiple port bandwidth configurations and there only needs to be a calculation of the total number of instances of the ALU needed. In other words, since the present disclosure allows for the scattering reduction data over multiple instances and gathering the reduction data after the reduction operation (in the correct manner), changing the port bandwidth does not require any changes to the reduction logic macro to match the port logic as in legacy architecture, but rather with the present disclosure the port bandwidth may be changed by adding another fixed-size reduction unit.

According to at least some embodiments of the present disclosure, a grid of ALUs (e.g., reduction units or fixed size reduction units) can be provided, which are shared/shareable among some or all switch ports. The sharing of reduction units can be controlled or managed by a distributed management system, such as a resource manager. Providing a grid of reduction units that are shareable helps decouple the connection between switch ports and reduction units, meaning that there no longer has to be the same number of reduction units as ports.

A network device is provided that includes: a plurality of ports providing switching capabilities to a communication network, where the network device performs data reduction operations; a plurality of reduction units, where the plurality of reduction units are decoupled from the plurality of ports performing the switching capabilities; and a resource manager that is configured to allocate one or more reduction units from the plurality of reduction units to one or more ports in the plurality of ports performing the data reduction operations.

In some embodiments, the plurality of reduction units include Arithmetic Logic Units (ALUs).

In some embodiments, a number of ports in the network device may be different than a total number of reduction units in the network device.

In some embodiments, a bandwidth of each of the plurality of reduction units is flexible to be different than a bandwidth of each of the plurality of ports.

In some embodiments, a total bandwidth for the data reduction operations is flexible to be different than a total bandwidth of the network device.

In some embodiments, the resource manager is configured to perform scatter, gather, and rebalancing functions to allocate reduction units from the plurality of reduction units to each port performing the data reduction operations.

In some embodiments, the resource manager is configured to perform scatter and gather functions to spread data for the data reduction operations between the plurality of reduction units in an equal manner regardless of which port originally received the data.

In some embodiments, the resource manager includes configurable forwarding circuitry.

In some embodiments, the resource manager includes configurable forwarding circuitry using multiple forwarding connection paths inside the network device.

In some embodiments, ports performing the data reduction operations are configured to receive data messages comprising a reduction operation and respective data portions, and are configured to send the reduction operation to the plurality of reduction units. The plurality of reduction units are also configured to apply the reduction operation to the respective data portions.

Another aspect of the present disclosure is to provide a system, where the system includes: a network device including: a plurality of ports providing switching capabilities to a communication network, where the network devices performs data reduction operations; a plurality of reduction units, where the plurality of reduction units are decoupled from the plurality of ports performing the switching capabilities; and a resource manager to allocate one or more reduction units from the plurality of reduction units to one or more ports in the plurality of ports performing the data reduction operations.

Another aspect of the present disclosure is to provide a network device that includes: a plurality of reduction units, where the plurality of reduction units are decoupled from one or more ports of the network device; and a resource manager that is configured to allocate one or more reduction units from the plurality of reduction units to the one or more ports.

Another aspect of the present disclosure is to provide a network device that includes: a plurality of ports connectable to a communication network; one or more reduction units decoupled from the plurality of ports; and configurable logic to service packet transmission between the one or more reduction units and the plurality of ports.

In some embodiments, the configurable logic includes a resource manager to manage allocation of the one or more reduction units from the grid of reduction units to the plurality of ports.

In some embodiments, the resource manager selectively assigns reduction units from the grid of reduction units to a port from the plurality of ports depending upon a bandwidth required by the port.

In some embodiments, the resource manager performs at least one of a scatter, gather, and rebalancing function to allocate the one or more reduction units from the grid of reduction units to the plurality of ports.

In some embodiments, the resource manager and the one or more reduction units are provided on a common silicon die.

In some embodiments, the resource manager and the one or more reduction units are provided on different silicon die.

In some embodiments, the one or more reduction units are shareable among the plurality of ports.

In some embodiments, each port in the plurality of ports belongs to a respective port complex and the one or more reduction units are decoupled from each port complex.

In some embodiments, a reduction unit from the one or more reduction units is shared between at least two ports from the plurality of ports.

Examples may include one of the above-noted features, or any combination thereof.

BRIEF DESCRIPTION OF THE DRAWINGS

FIG. 6 is a flow diagram illustrating a method in accordance with aspects of the present disclosure.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Crossbar switches are designed to implement permutations of connections among source and destination ports. The terms "crossbar switch," "crossbar," and "crossbar circuit" may be used interchangeably herein. The terms "crossbar cell," "sub-crossbar cell," "sub-crossbar," and "sub-crossbar circuit" may be used interchangeably herein.

Aspects of the disclosure are further illustrated by and described with reference to apparatus diagrams, system diagrams, and flowcharts that relate to achieving high reduction bandwidth capacity.

Figure 1:
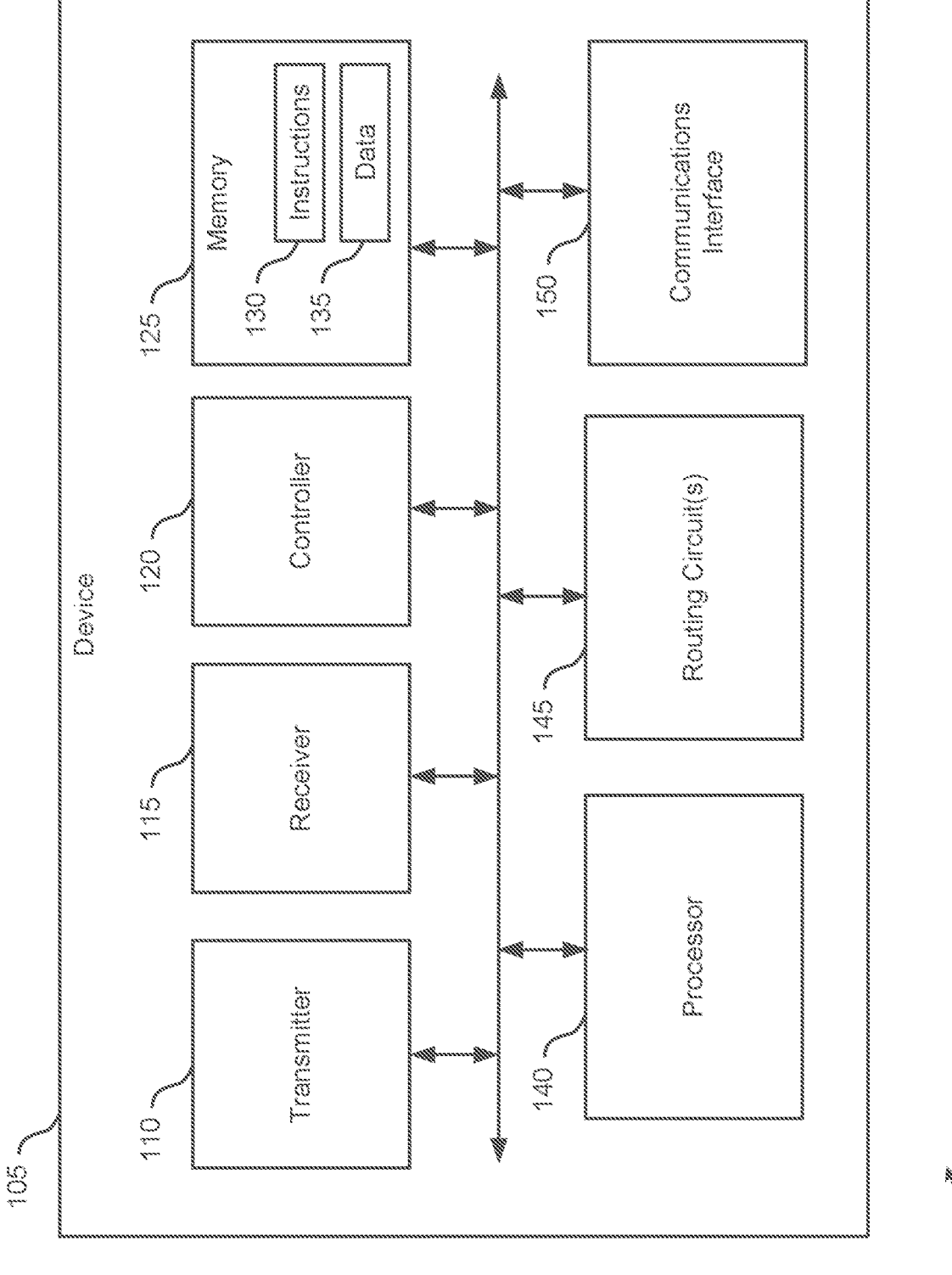
FIG. 1 illustrates an example of a system in accordance with aspects of the present disclosure.

FIG. 1 illustrates an example of a system 100 in accordance with aspects of the present disclosure. An illustrative system 100 may include one or more routing circuits 145. In some embodiments, the one or more routing circuits 145 may correspond to or be provided as part of or more crossbar circuits 208 shown in FIG. 2. Routing of packets by the device 105 may be implemented using the various components of the device 105. Illustratively, and without limitation, the device 105 may include a transmitter 110, a receiver 115, a controller 120, memory 125, a processor 140, the one or more routing circuits 145, and a communications interface 150.

The communications interface 150 may include one or multiple communication ports, which may be treated as source ports and/or destination ports. Packets received at the communications interface 150 may be processed by a receiver 115, then may be processed by the controller 120 and/or processor 140 that utilizes instructions 130 and/or data 135 to make routing decisions for the packet. When a routing decision is made for a packet, then the packet (or portions thereof) may passed to a transmitter 110 which causes the packet (or portions thereof) to be transmitted to a destination address via the communications interface 150. As will be described in further detail herein, the routing circuit(s) 145 may be responsible for efficiently transferring a packet from a packet source to a packet destination.

In some examples, the memory 125 may be or include any electronic component capable of storing electronic information. The memory 125 may include one or multiple different types of computer memory devices. Likewise, the processor 140 may include one or multiple different types of processing devices. Non-limiting examples of processing devices that may be provided as part of the processor 140 include a GPU, a Central Processing Unit (CPU), an Integrated Circuit (IC) chip, a microprocessor, a multi-cored processor, a Data Processing Unit (DPU), or the like.

Figure 2:
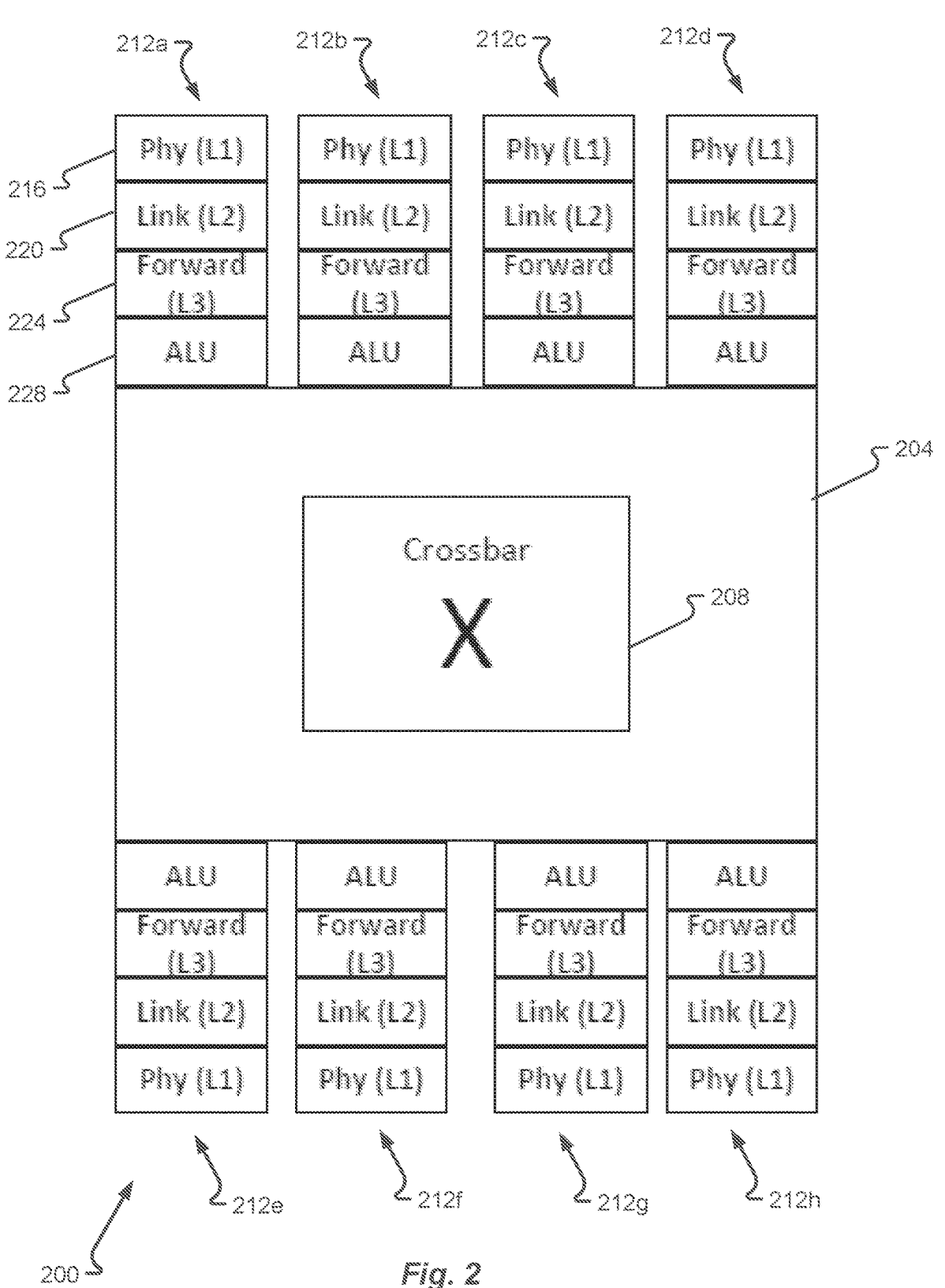
FIG. 2 is a block diagram illustrating additional details of a device in accordance with aspects of the present disclosure.

As will be described in further detail herein, the routing circuit(s) 145 may be included in one or more crossbar circuits 208 (as illustrated in FIG. 2), and may form a communication network 204 (also referred to herein as a network fabric—as shown in FIG. 2) for communicating packets or data between the memory 125 and/or processor(s) 140. A crossbar circuit 208 in FIG. 2 may include control logic for setting up transfer paths for communicating packets or data between a memory 125 and a processor 140.

In some examples, components of the device 105 (e.g., transmitter 110, receiver 115, controller 120, memory 125, processor 140, routing circuit(s) 145, communications interface 150, etc.) may communicate over a system bus (e.g., control busses, address busses, data busses, etc.) included in the device 105.

The transmitter 110 and the receiver 115 may support the transmission and reception of signals to and from the device 105. In some aspects, the transmitter 110 and the receiver 115 may support the transmission and reception of signals within the device 105. The transmitter 110 and receiver 115 may be collectively referred to as a transceiver. An antenna may be electrically coupled to the transceiver. The device 105 may also include (not shown) multiple transmitters 110, multiple receivers 115, multiple transceivers and/or multiple antennas.

The controller 120 may be located on a same chip (e.g., ASIC chip) as the transmitter 110 and/or the receiver 115. In some cases, the controller 120 may be located on a different chip as the transmitter 110 and/or the receiver 115. In some examples, the controller 120 may be located on a chip of or on a chip of another device 105. In some examples, the controller 120 may be a programmed microprocessor or microcontroller. In some aspects, the controller 120 may include one or more CPUs, memory, and programmable input/output (I/O) peripherals. The controller 120 may control the routing circuit(s) 145 to route data according to the techniques described herein.

The memory 125 may be any electronic component capable of storing electronic information. The memory 125 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 125 may include instructions 130 (computer readable code) and data 135 stored thereon. The instructions 130 may be executable by the processor 140 to implement the methods disclosed herein. In some aspects, execution of the instructions 130 may involve one or more portions of the data 135. In some examples, when the processor 140 executes the instructions 130, various portions of the instructions 130 and/or the data 135 may be loaded onto the processor 140.

The processor 140 may correspond to one or multiple computer processing devices. For example, the processor 140 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 125 of the device 105). For example, upon executing the instructions 130 or data 135 stored in memory 125, the processor 140 may enable or perform one or more functions of the device 105. In some examples, a combination of processors 140 (e.g., an advanced reduced instruction set computer (RISC) machine (ARM) and a digital signal processor (DSP)) may be implemented in the device 105. In some embodiments, the instructions 130 and/or data 135, when executed by the processor 140, may enable the device 105 to manage an allocation of reduction units among ports of the device 105. Additional details of such capabilities will be described in further detail herein.

The communications interface 150 may support interactions (e.g., via a physical or virtual interface) between a user and the device 105. The communications interface 150 may include one or more communication ports and drivers thereof. Illustratively, the communications interface 150 may facilitate the machine-to-machine exchange of packets via wired and/or wireless communications.

Example aspects of the crossbar circuits 208, memory 125, and processors 140 will be described with reference now to FIGS. 2-6.

Figure 3:
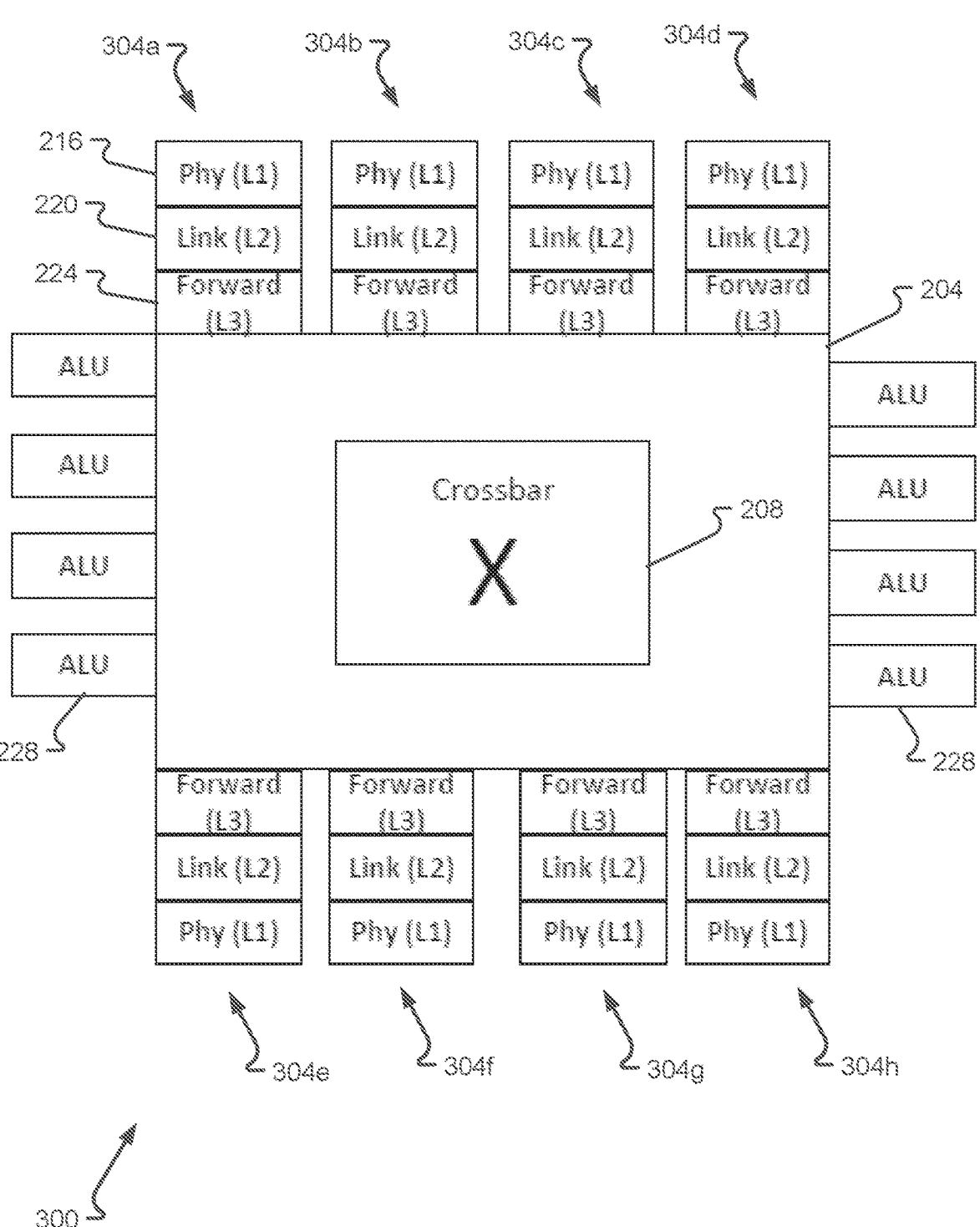
FIG. 3 is a block diagram illustrating an alternative configuration of a device in accordance with aspect of the present disclosure.
Figure 4:
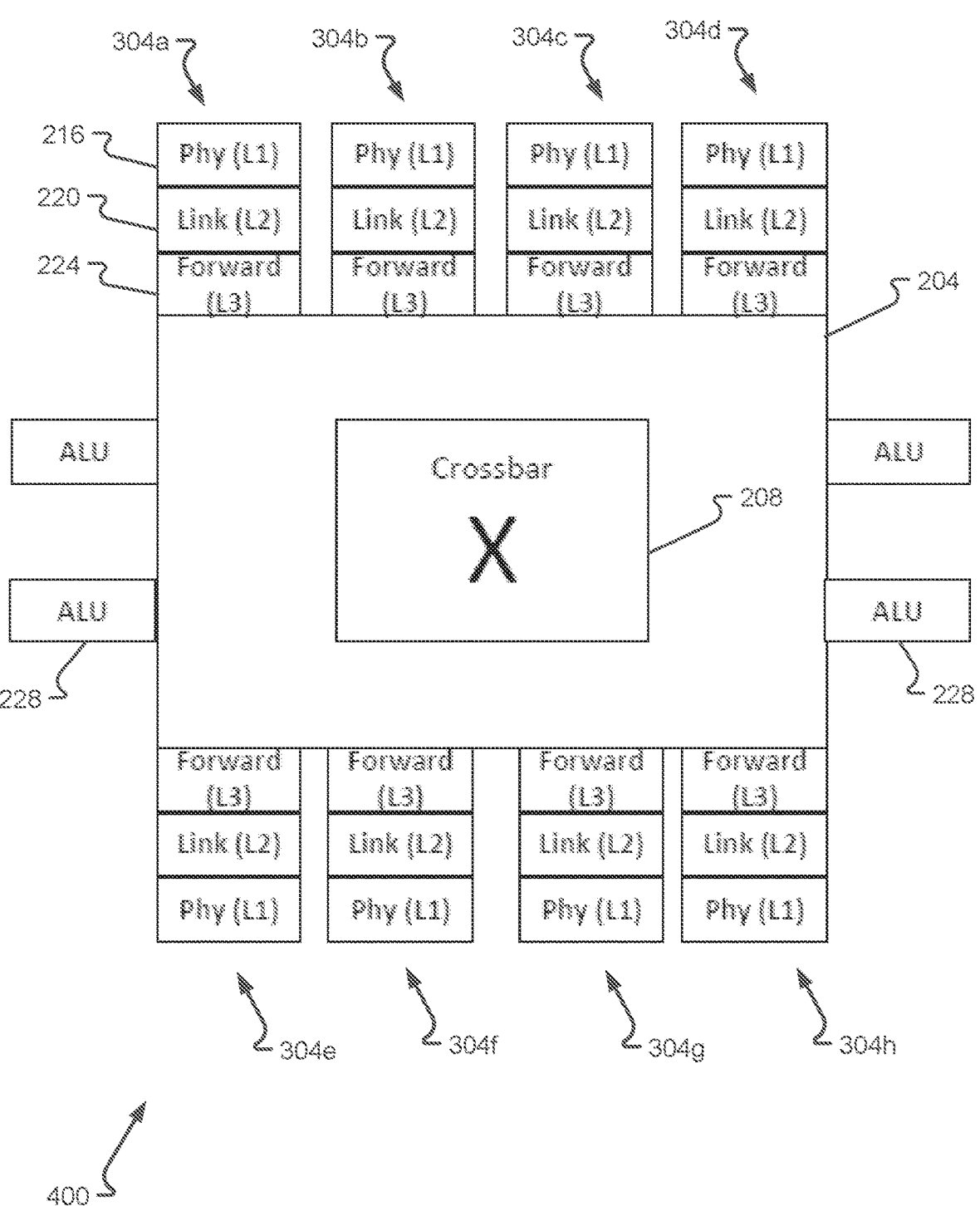
FIG. 4 is a block diagram illustrating another alternative configuration of a device in accordance with aspects of the present disclosure.
Figure 5:
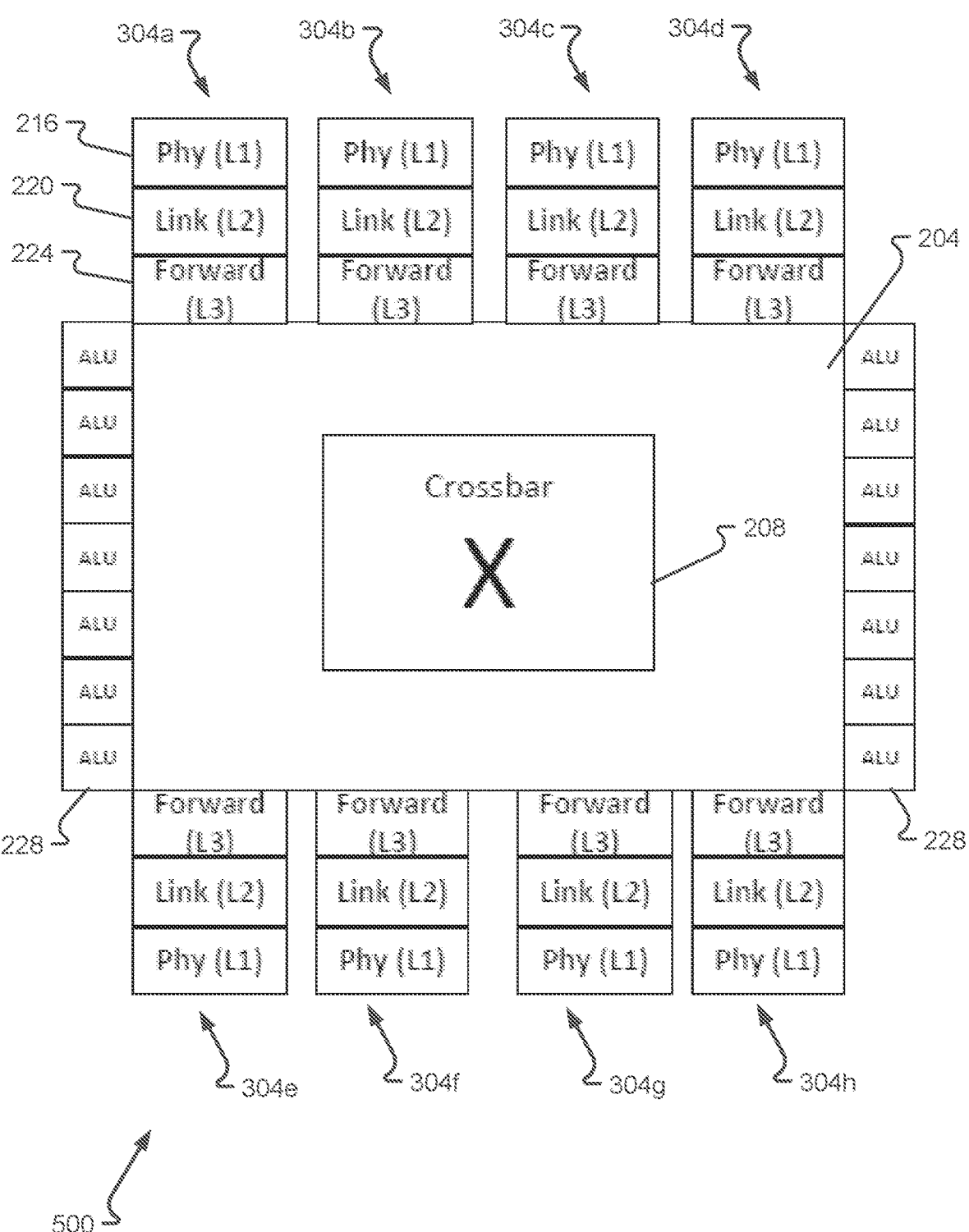
FIG. 5 is a block diagram illustrating yet another alternative configuration of a device in accordance with aspects of the present disclosure.

FIG. 2 illustrates an example of a system 200 supported by aspects of the present disclosure. The system 200 may be provided as a part of or may include a device 105 as described in FIG. 1. As an example, the system 200 may include a switch, server, or the like that includes one or more crossbar circuits 208 and that enables network connectivity among a plurality of computing devices. In some embodiments, the system 200 may be or include the routing circuit(s) 145. As will be discussed in further detail herein, a crossbar circuit 208 may be used to facilitate packet routing between ports of the device 105. In some embodiments, each physical port of the device 105 may be referred to as a port complex 212. The system 200 of FIG. 2 illustratively, but without limitation, includes eight port complexes 212*a-h*. It should be appreciated that a system 200 or device 105 may include a greater or lesser number of physical ports (e.g., port complexes 212) than are depicted and described herein. The term port or port complex 212 as used herein may refer to the physical interface of a device or system that accepts a network connector. It should be appreciated that a port or port complex 212 may include a number of components that enable functionality of the port or port complex 212. As The system 200 of FIG. 2 illustrates a traditional system 200 in which each port complex 212*a-h* includes a physical layer 216 (e.g., an L1 layer), a link layer 220 (e.g., an L2 layer), a forward layer 224 (e.g., an L3 layer), and a reduction unit 228. In the configuration depicted in FIG. 2, there is a 1:1 allocation of reduction units 228 to port complexes 212. FIGS. 3-5 illustrate alternative configurations of a system 300, 400, 500 in which the number of reduction units 228 does not necessarily have to equal the number of ports (or port complexes 212).

As noted above, the processor 140 may be configured to manage an allocation of reduction units 228 to ports (or port complexes 212). The processor 140, in some embodiments, may execute instructions 130 and/or data 135 that includes a resource manager or a resource manager instruction set. The resource manager 130, 135, when executed by the processor 140, may allocate one or more reduction units 228 to one or more ports (or port complexes 212). Once allocated to a particular port or port complex 212, the allocated reduction unit 228 may be enabled to perform data reduction operation(s) on packets passing into and/or out of the particular port or port complex 212. The resource manager 130, 135, in some embodiments, may help to decouple the reduction units 228 from the ports or port complexes 212.

In some embodiments, a reduction unit 228 may correspond to or include an arithmetic logic unit (ALU) or similar type of processing circuitry. As an example, the reduction unit 228 may include any suitable type of combinational circuit (e.g., analog and/or digital circuit) that is capable of performing arithmetic and/or bitwise operations on binary numbers. It should be appreciated that not all of the reduction units 228 depicted and described herein need to be of the same type. For instance, embodiments of the present disclosure contemplate the ability to provide the device 105 or system 200, 300, 400, 500, with different types of reduction units 228, which may have different capabilities, capacities, purposes, etc.

As mentioned above, the reduction units 228 may be decoupled from the ports or port complexes 212. Each port or port complex 212 may utilize a reduction unit 228 to perform data reduction operations, thereby enabling the ports to provide switching capabilities. When the reduction units 228 are decoupled from the ports or port complexes 212, the resource manager 130, 135 may be configured to assign or allocate reduction units 228 to particular ports or port complexes 212. In other words, the number of ports or port complexes 212 in the device may be different than a total number of reduction units 228 in the device.

The example illustrated in FIG. 3 shows a system 300 where the ports or port complexes 304a-h are decoupled from the reduction units 228, but the number of ports or port complexes 304a-h are the same as the number of reduction units 228. In this particular configuration, the system 300 decouples the reduction units 228 from the ports, but the same bandwidth is offered for the ports and for the reduction units 228. The port complexes 304a-h are different from the port complexes 212a-h in that the port complexes 304a-h do not have a reduction unit 228 integrated therein. Decoupling the reduction units 228 from the port complexes 304a-h in this way enables greater flexibility with respect to bandwidth and/or data reduction capabilities offered by the system 300 as compared to configurations where the reduction units 228 are not decoupled.

The example illustrated in FIG. 4 shows a system 400 where the ports or port complexes 304a-h are decoupled from the reduction units 228, and the number of ports or port complexes 304a-h is greater than the number of reduction units 228. In this particular configuration, the system 300 decouples the reduction units 228 from the ports, and less bandwidth is available via the reduction units 228 as compared to the ports or port complexes 304a-h. Much like the configuration of system 300, decoupling the reduction units 228 from the port complexes 304a-h in this way enables greater flexibility with respect to bandwidth and/or data reduction capabilities offered by the system 400 as compared to configurations where the reduction units 228 are not decoupled. The number of reduction units 228 provided may be decreased without necessarily decreasing the number of ports or port complexes 304a-h.

The example illustrated in FIG. 5 shows a system 500 where the ports or port complexes 304a-h are decoupled from the reduction units 228, but the number of ports or port complexes 304a-h are less than the number of reduction units 228. In this particular configuration, the system 500 decouples the reduction units 228 from the ports, but the same bandwidth is offered for the ports and for the reduction units 228. By offering a different number of reduction units 228 and ports or port complexes 304a-h, the resource manager 130, 135 may be utilized to allocate different reduction units 228 among the plurality of ports or port complexes 304a-h.

In any system configuration depicted and described herein, the resource manager 130, 135 may be configured to perform scatter, gather, and/or rebalancing functions to allocate the reduction units 228 among the different ports or port complexes. In some embodiments, the resource manager 130, 135 may be configured to perform scatter and gather functions to spread data for the data reduction operations associated with one port or port complex 304a-h between a plurality of reduction units 228. In some embodiments, the resource manager 130, 135 may spread data between a plurality of reduction units 228 in an equal manner, regardless of which port originally received the data. The resource manager 130, 135 may also comprise configurable forwarding circuitry and may be configured to use multiple forwarding connection paths inside the device (e.g., within the crossbar circuit 208 or network 204).

As shown in each of FIGS. 3-5, the reduction units 228 may be provided as a grid of reduction units. Each reduction unit 228 in the grid of reduction units can be dynamically connected to a port or port complex 304a-h, based on allocation decisions made by the resource manager 130, 135. In some embodiments, the crossbar circuit 208 may be used to facilitate the connectivity between ports or port complexes 304a-h and reduction units 228 in the grid of reduction units. In some embodiments, different circuitry may be utilized to carry information between a port or port complex and a reduction unit 228. The resource manager 130, 135 may be configured to selectively assign reduction units 228 from the grid of reduction units to a port depending upon a bandwidth required by the port. The selective assignment decisions may be made prior to receiving data at a port or may be made in response to receiving data at a port. It should be appreciated that the resource manager 130, 135 and the reduction units 228 may be provided on a common silicon die (e.g., share space on a common piece of silicon). It should also be appreciated that the resource manager 130, 135 and the reduction units 228 may be provided on different silicon die (e.g., not share space on a common piece of silicon).

FIG. 6 illustrates an example of a process 600 in accordance with aspects of the present disclosure. In some examples, process 600 may be implemented by aspects of a device 105 or system 200, 300, 400, 500.

In the following description of the process 600, the operations may be performed in a different order than the order shown, or the operations may be performed in different orders, at the same times, or at different times. Certain operations may also be left out of the process 600, or other operations may be added to the process 600.

The process 600 may begin by providing one or more port complexes 304 on a device 105 (step 604). The number of port complexes 304 provided on the device 105 may be any integer number from 1 to n.

The process 600 may continue by providing one or more reduction units 228 on the device 105 (step 608). The number of reduction units 228 may be the same as the number of port complexes 304, but does not necessarily have to be the same. The number of reduction units 228 provided on the device 105 may be any integer number from 1 to m. Said another way, the number of reduction units 228 may be greater than, less than, or equal to the number of port complexes 304 on the device 105 (step 612). The reduction units 228 may be provided as a grid of reduction units.

The process 600 may continue by enabling the one or more reduction units 228 to be shared between the port complexes 304 (step 616). Sharing of the reduction units 228 may be managed by the resource manager 130, 135. In particular, the resource manager 130, 135 may be configured to manage an association or assignment of reduction units 228 to port complexes 304 (step 620). In some embodiments, the resource manager 130, 135 may be configured to perform scatter, gather, and/or rebalancing functions to allocate the reduction unit(s) 228 to port complexes 304 (step 624).

By allocating the reduction units 228 to port complexes 304, the resource manager 130, 135 enables packet processing for port complexes 304 with the reduction unit(s) 228 assigned thereto (step 628).

Any of the steps, functions, and operations discussed herein can be performed continuously and automatically.

The exemplary apparatuses, systems, and methods of this disclosure have been described in relation to examples of a crossbar circuit. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network device, comprising:
   a plurality of ports providing switching capabilities to a communication network;
   a plurality of reduction units to perform data reduction operations, wherein the plurality of reduction units are decoupled from the plurality of ports performing the switching capabilities; and
   one or more circuits to selectively allocate one or more reduction units from the plurality of reduction units to one or more ports in the plurality of ports such that a number of the one or more reduction units allocated for performing a data reduction operation varies according to a bandwidth of the one or more ports.

2. The network device of claim 1, wherein the plurality of reduction units comprise arithmetic logic units (ALUs), wherein a header of a packet is removed before the packet is processed by a reduction unit.

3. The network device of claim 1, wherein a number of ports in the network device is different than a total number of reduction units in the network device.

4. The network device of claim 1, further comprising:
   a n×m crossbar switch to connected between the plurality of ports and the plurality of reduction units, wherein n is a number of the plurality of ports and m is a number of the plurality of reduction units, and wherein n and m are different numbers.

5. The network device of claim 1, wherein a total bandwidth for the data reduction operations is flexible to be different than a total bandwidth of the network device.

6. The network device of claim 1, wherein the one or more circuits are to perform scatter, gather, and rebalancing functions to allocate reduction units from the plurality of reduction units to each port performing the data reduction operations.

7. The network device of claim 1, wherein the one or more circuits are to perform scatter and gather functions to spread data for the data reduction operations between the plurality of reduction units in an equal manner regardless of which port originally received the data.

8. The network device of claim 1, wherein the one or more circuits comprise configurable forwarding circuitry.

9. The network device of claim 1, wherein the one or more circuits comprise configurable forwarding circuitry using multiple forwarding connection paths inside the network device.

10. The network device of claim 1, wherein ports performing the data reduction operations are to receive data messages comprising a reduction operation and respective data portions, and are to send the reduction operation to the plurality of reduction units, and wherein the plurality of reduction units are to apply the reduction operation to the respective data portions.

11. A system, comprising:

a network device including:
  a plurality of ports providing switching capabilities to a communication network;
  a plurality of reduction units to perform data reduction operations, wherein the plurality of reduction units are decoupled from the plurality of ports performing the switching capabilities; and
  one or more circuits to allocate one or more reduction units from the plurality of reduction units to one or more ports in the plurality of ports performing the data reduction operations such that a number of the one or more reduction units allocated for performing a data reduction operation varies according to a bandwidth of the one or more ports.

12. The system of claim 11, wherein the plurality of reduction units comprise arithmetic logic units (ALUs), wherein a header of a packet is removed before the packet is processed by a reduction unit.

13. The system of claim 11, wherein a number of ports in the network device is different than a total number of reduction units in the network device.

14. The system of claim 11, wherein a total bandwidth for the data reduction operations is flexible to be different than a total bandwidth of the network device.

15. The system of claim 11, wherein the one or more circuits are to perform scatter, gather, and rebalancing functions to allocate reduction units from the plurality of reduction units to each port performing the data reduction operations.

16. The system of claim 11, wherein ports performing the data reduction operations are to receive data messages comprising a reduction operation and respective data portions, and are to send the reduction operation to the plurality of reduction units, and wherein the plurality of reduction units are to apply the reduction operation to the respective data portions.

17. The system of claim 11, wherein the one or more circuits comprise configurable forwarding circuitry.

18. A network device, comprising:

a plurality of ports connectable to a communication network;

one or more reduction units decoupled from the plurality of ports; and configurable logic to manage allocation of the one or more reduction units to the plurality of ports such that a number of the one or more reduction units allocated for performing a data reduction operation varies according to a bandwidth of the one or more ports.

19. The network device of claim 18, wherein the one or more reduction units comprise one or more arithmetic logic units (ALUs), and wherein the one or more reduction units are provided in a grid of reduction units.

20. The network device of claim 19, wherein the configurable logic is to perform at least one of a scatter, gather, and rebalancing function to allocate the one or more reduction units from the grid of reduction units to the plurality of ports.

\*　　\*　　\*　　\*　　\*